(12) United States Patent
Dillon et al.

(10) Patent No.: US 6,289,990 B1
(45) Date of Patent: Sep. 18, 2001

(54) PRODUCTION TUBING SHUNT VALVE

(75) Inventors: David B. Dillon, Eagle River, AK (US); David L. Olson, Los Alamatos; Steven K. Tetzlaff, Huntington Beach, both of CA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/534,686

(22) Filed: Mar. 24, 2000

Related U.S. Application Data
(60) Provisional application No. 60/125,854, filed on Mar. 24, 1999.

(51) Int. Cl.$^7$ ..................................................... E21B 43/12
(52) U.S. Cl. .............................. 166/319; 166/373; 166/68
(58) Field of Search .............................. 166/68, 319, 320, 166/321, 324, 334.1, 334.4, 373, 311; 417/131, 134

(56) References Cited

U.S. PATENT DOCUMENTS

| | | |
|---|---|---|
| 2,610,859 | 9/1952 | Wilcox et al. . |
| 3,034,527 | 5/1962 | Hennells . |
| 3,967,635 | 7/1976 | Sealfon et al. . |
| 4,470,428 | 9/1984 | Bishop et al. . |
| 5,372,197 * | 12/1994 | Wacker ................................. 166/311 |
| 5,479,991 * | 1/1996 | Robison et al. ...................... 166/387 |
| 6,021,849 * | 2/2000 | Averhoff .............................. 166/372 |
| 6,095,759 * | 8/2000 | Breslin ................................ 417/131 |

FOREIGN PATENT DOCUMENTS

| | | | |
|---|---|---|---|
| 2083524A | 3/1982 | (GB) | ............................. E21B/34/08 |
| 2290319A | 12/1995 | (GB) | ............................. E21B/3/406 |

* cited by examiner

Primary Examiner—Frank S. Tsay
(74) Attorney, Agent, or Firm—Bracewell & Patterson, L.L.P.

(57) ABSTRACT

A submersible pump assembly suspended on a string of tubing in a well has a valve that drains the tubing above the pump when the pump shuts down. The valve includes a valve housing installed with the tubing string above the submersible pump assembly. The valve housing has an interior in communication with fluid in the string of tubing above the valve housing, and a shunt port communicating the interior of the valve housing with an annulus surrounding the string of tubing. A valve cage is slidably received within the valve housing for movement between upper and lower positions. The valve cage blocks communication through the shunt port while in the upper position, and while in the lower position, opens the shunt port. A valve seat is located in the valve cage, and a valve member moves between a lower position, sealingly engaging the valve seat, and an upper position, allowing flow through the valve seat from the pump to the tubing string. Pump pressure causes the valve cage and the valve member to move to the upper positions. Ceasing operation of the submersible pump assembly causes the valve cage and the valve member to move to the lower positions, allowing fluid in the tubing string to flow out the shunt port to equalize with fluid in the annulus.

19 Claims, 2 Drawing Sheets

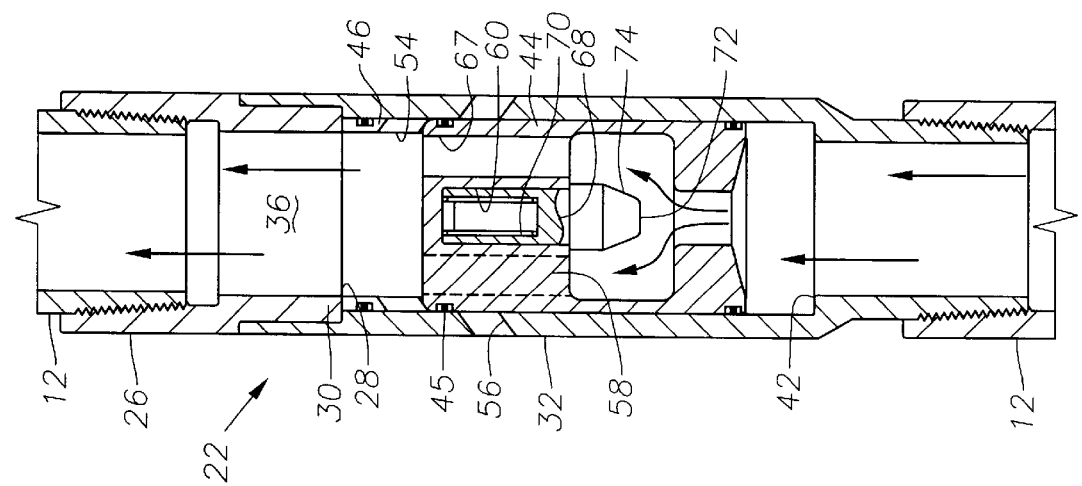
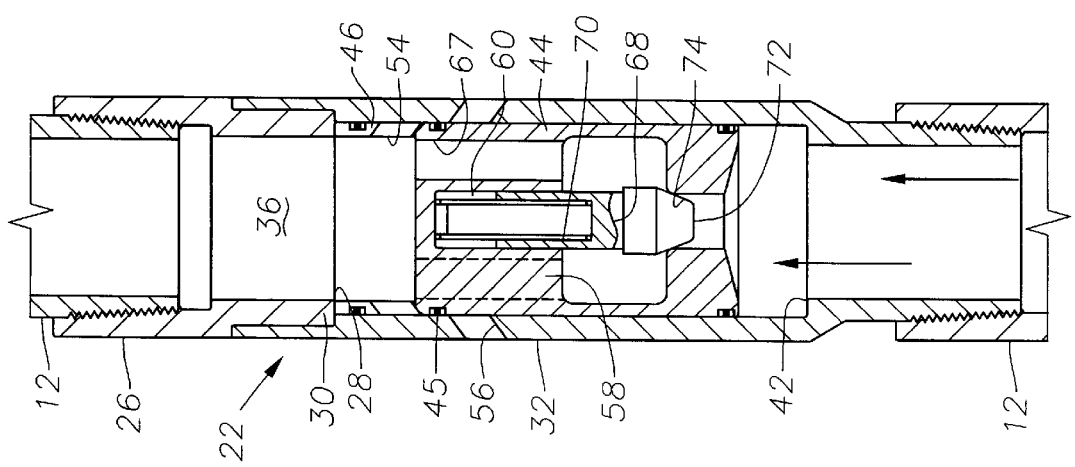
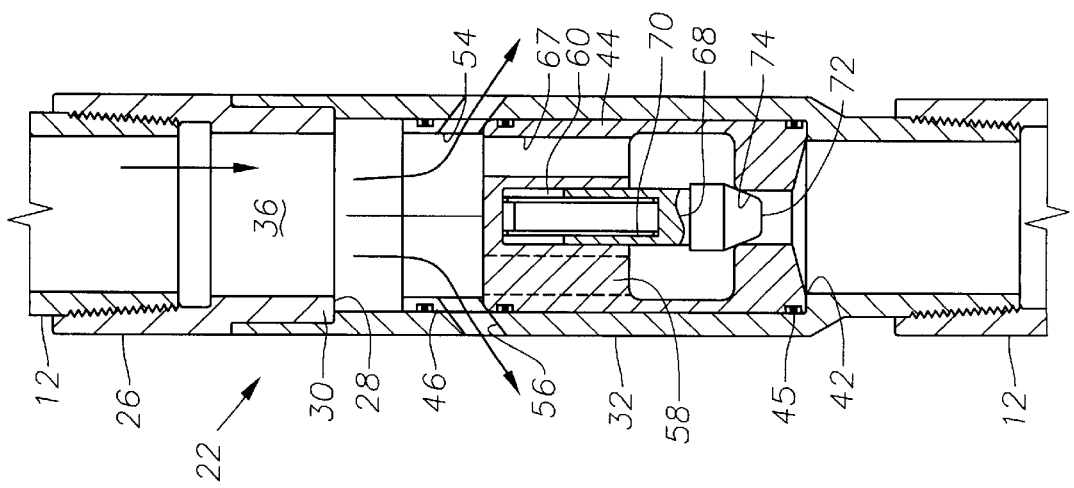

PRODUCTION TUBING SHUNT VALVE

This application claims the benefits of Provisional Patent Application Ser. No. 60/125,854, filed Mar. 24, 1999.

TECHNICAL FIELD

This invention relates in general to submersible pumping assemblies and in particular to a valve mounted in a string of tubing above a pump assembly that allows fluid in the tubing string to flow out into the annulus when the pump shuts down.

BACKGROUND ART

A typical submersible pump assembly includes a downhole electrical motor and a pump separated by a seal section. Often the pump is a centrifugal type, although progressive cavity types are also employed. The pump assembly is usually suspended on a string of tubing that extends into the cased well. The pump discharges well fluid up the tubing.

When the pump shuts down, either planned or unplanned, fluid may flow back down through the tubing and out the intake of the pump, possibly spinning the pump in reverse. This occurs until the level of fluid in the tubing equals that in the tubing annulus surrounding the tubing. The downward flow through the pump may bring debris in the tubing back into the pump, causing damage on later restarting. Also, at times, the tubing string or the pump can pack off or plug after a shut down. This may prevent flow back down the tubing. If the tubing does not drain, the operator may then have to bail out the production fluid before pulling the pump and tubing. Bailing involves running a bailer on a wire line repeatedly down into the tubing, taking time.

SUMMARY OF THE INVENTION

A valve is provided for installation in a tubing string above a pump discharge of an electrical submersible pump (ESP). Fluid or "head" generated by operation of the ESP closes the valve by forcing a valve member and valve cage upward. The valve member and valve cage combine to form a piston. Once in the upper position, the valve cage seals off a shunt port in a wall of the valve body. The valve member moves upward then, opening a valve seat in the valve cage. The closed shunt port prevents communication between the inside of tubing above the valve and an annular area between the tubing string and the well casing. When the pump is shut down, a static fluid column of produced fluid above the shunt valve opens the shunt port by forcing the valve cage and valve member assembly downward, thereby exposing the shunt port.

The exposed shunt port allows produced materials to drain back into the well annulus. The produced material will continue to flow out of the shunt port into the well annulus until pressure within the tubing string and the annular area are equalized. The operator may also circulate fluid down the tubing string and back up the annulus to flush the tubing string.

BRIEF DESCRIPTION OF THE DRAWINGS

FIG. 2 is an enlarged cross-sectional view of the tubing shunt valve of FIG. 1, shown in a lower position during shunt operation.

FIG. 3 is an enlarged cross-sectional view of the tubing shunt valve of FIG. 1, shown in an upper position during start up operation.

FIG. 4 is an enlarged cross-sectional view of the tubing shunt valve of FIG. 1, shown in an upper position during producing operation.

DETAILED DESCRIPTION OF THE INVENTION

Figure 1A:
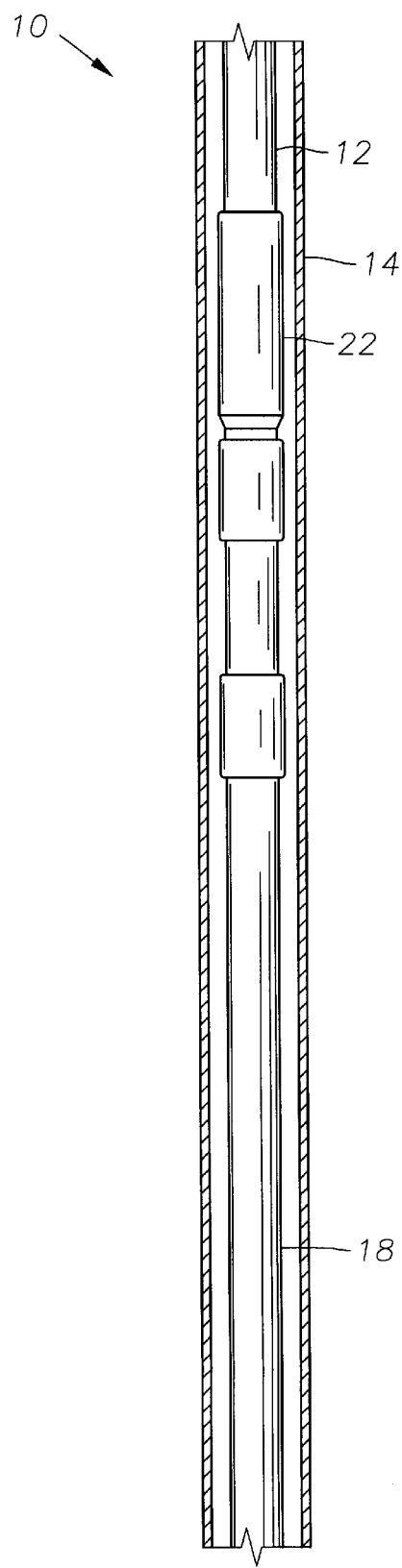
FIGS. 1A and 1B comprise an elevational view of an electrical submersible pump assembly supported on tubing within casing in a well including a tubing shunt valve in accordance with this invention.
Figure 1B:
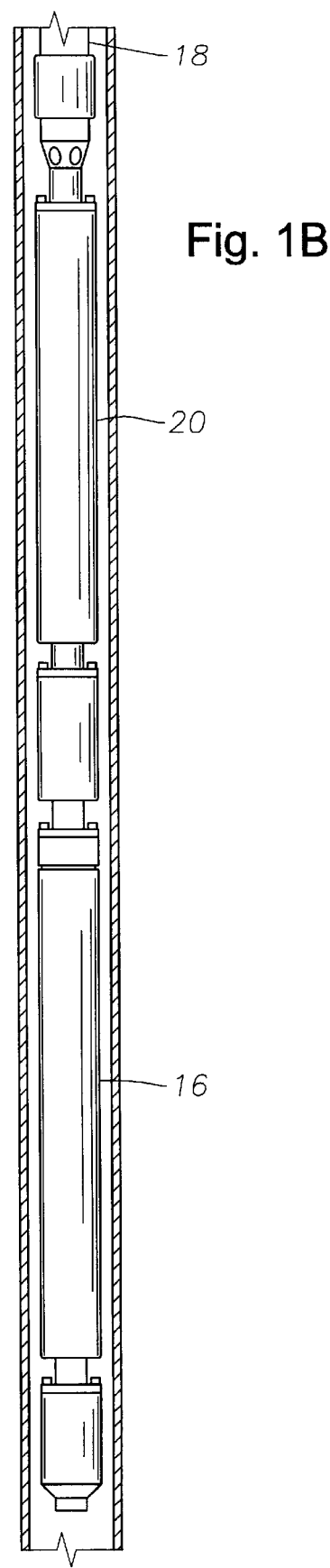

Referring now to FIG. 1, a typical electrical submersible pump assembly is designated generally 10. Tubing 12 is run within casing 14 from the surface to provide a conduit to carry produced fluids to ground surface. Electrical submersible pump (ESP) assembly 10 includes a motor 16, which drives a pump 18. Motor 16 and pump 18 are typically separated by a seal section 20. Seal section 20 equalizes pressure of lubricant within motor 16 with that of the tubing annulus 24. Motor 16 is normally a three-phase electrical motor. Pump 18 is typically a centrifugal pump, although it might also be a progressing cavity pump.

A tubing shunt valve 22 of the invention is connected to tubing 12 at a location above the outlet of pump 18. An enlarged cross-sectional view of tubing shunt valve 22 is shown in FIGS. 2–4. An upper collar 26 is connected to a lower end of a section of tubing 12. Upper collar 26 defines an upper interior rim 28 at its lower end 30. A valve body or housing 32 secures to collar 26 and has an annular wall that defines an interior chamber 36. A lower end of valve body 32 engages an upper end of a section of a string of tubing 12 below tubing shunt valve 22. Valve body 32 has a lower interior rim 42.

A valve cage 44 is slidably received within interior chamber 36 of valve body 32 and sealed by upper and lower seals 45. Valve cage 44 has a sleeve portion 46 on its upper portion defined by an annular wall that is slidingly and sealingly received within valve body 32. The upper end of valve cage 44 abuts upper interior rim 28 when valve cage 44 is in an upper position (FIGS. 3 and 4). The lower end of valve cage 44 abuts the lower interior rim 42 when valve cage 44 is in a lower position (FIG. 2). Valve cage 44 has a plurality of openings 54 in its upper sleeve portion 46 for allowing fluid to pass through a shunt port 56 provided in the wall of valve body 32. Shunt port 56 communicates annulus 24 (FIG. 1) with interior chamber 36 of valve body 32. Shunt port 56 is open when valve cage 44 is in a lower position (FIG. 2) because openings 54 will be in communication with shunt ports 56. Shunt port 56 is closed when valve cage 44 is in an upper position (FIGS. 3 and 4) because openings 54 will be spaced above shunt ports 56 and seals 45 will be above and below shunt ports 56.

Valve cage 44 has a central support section 58 below its upper sleeve portion 46. Support section has a bore 60 located on the axis of valve cage 44. Bore 60 has a closed upper end and an open lower end. A plurality of axial passages 67 (only one shown) extend through sleeve support 58 and are spaced around bore 60. A valve member shank 68 is slidably received within the lower open end of bore 60. Shank 68 is cylindrical buit is not sealed within bore 60. A spring 70 or other biasing device is positioned between the closed upper end of bore 60 and an upper end of valve member shank 68 for biasing valve member shank 68 downward. A valve member head 72 is affixed to a lower end of valve member shank 68. Head 72 is preferably frusto-conical in configuration. A valve seat 74 is preferably integrally formed within valve cage 44 on a lower end of valve cage 44. Valve seat 74 is spaced below the lower end of support section 58. Valve seat 74 is provided to receive valve member head 72 in sealing engagement when valve member 68 is in a lower position. Valve seat 74 is in communication with the discharge of pump 18 (FIG. 1A).

In practice, tubing shunt valve 22 is connected into tubing 12. Electrical submersible pump assembly 10 is affixed to a lower end of tubing 12 below tubing shunt valve 22. When pump 18 begins to operate, fluid pressure generated by pump 18 closes tubing shunt valve 22 by forcing valve cage 44 upwards. The pressure acts against a piston formed by the combination of the lower end of valve cage 44 and valve head 72, which initially closes valve seat 74. The fluid does not initially pass through valve cage 44 because valve member head 72 on valve member 68 is biased into sealing engagement with valve seat 74 because of spring 70.

Therefore, valve cage 44 moves upwards until its upper end abuts upper interior rim 28 formed on upper collar 26. At this point, valve cage 44 is no longer capable of upward motion. Therefore, the fluid pressure from pump 18 forces valve member 68 upwards out of engagement with valve seat 74, deforming spring 70. Well fluid then passes through valve seat 74 and upwards through passages 67 in valve cage 44 and through tubing 12. When valve cage 44 is in an upper position, shunt ports 56 in valve body 32 are closed by valve cage 44 because openings 54 will be above shunt ports 56. Seals 45 on valve cage 44 will be positioned above and below shunt ports 56. The resulting closed shunt valve 22 prevents communication between the inside of tubing 12 and an annular area 24 between tubing 12 and the casing 14.

When pump 18 is shut down, a static fluid column of produced material is within tubing 12 above shunt valve 22. Since the pump is shut down, no fluid pressure acts upwards against valve member head 72. Therefore, spring 70 biases valve member 68 downward until valve member head 72 is in sealing engagement with valve seat 74, thus again forming a piston. The static fluid column of produced material opens shunt valve 22 by forcing valve cage 44 downward until the lower end of valve cage 44 engages lower interior rim 42 of valve body 32. When valve cage 44 is in this position, openings 54 in valve cage 44 are in alignment with shunt ports 56 of valve body 32. The alignment of openings 54 and shunt ports 56 allows produced materials to empty back into the well annulus 24. The produced material will continue to flow out of the shunt ports 56 into the well annulus 24 until pressure within tubing string 12 and annular area 24 are equalized. If desired, the operator may then pump fluid down tubing 12, which flows out shunt ports 56 and back up annulus 24.

There are several advantages associated with the production tubing shunt valve. The shunt valve can reduce the number of equipment pulls related to unit shutdowns that cannot be restarted due to plugging up and locking up of downhole lift systems due to debris fallback. If pulling is required and the tubing is plugged, the shunt valve avoids having to bail out the fluid from the tubing. The shunt valve allows an operator to reverse circulate down the tubing and back up the annulus for back flushing.

While the invention has been shown in only one of its forms, it should be apparent to those skilled in the art that it is not so limited, but is susceptible to various changes without departing from the scope of the invention.

We claim:

1. A well pumping apparatus for suspension on a string of tubing in a well, comprising:
    a submersible pump assembly adapted to be installed on a string of tubing;
    a valve housing adapted to be secured to the string of tubing above the submersible pump assembly, the valve housing having an interior adapted to be in communication with fluid in the string of tubing above the valve housing, and a shunt port for communicating the interior of the valve housing with an annulus surrounding the string of tubing;
    a shunt valve member slidably and sealingly received within the valve housing for movement between open and closed positions, the shunt valve member closing the shunt port while in the closed position, and while in the open position, opening the shunt port;
    a tubing access seat in the valve housing for communicating the submersible pump assembly with the string of tubing; and
    a tubing access valve member that moves between a closed position, closing the tubing access seat, and an open position, opening the tubing access seat; and wherein
    pressure exerted by operation of the submersible pump assembly causes the shunt valve member to move to the closed position and the tubing access valve member to move to the open position, and ceasing operation of the submersible pump assembly causes the shunt valve member to move to the open position and the tubing access valve member to move to the closed position, allowing fluid in the tubing string to flow out the shunt port to equalize with fluid in the annulus.

2. The apparatus according to claim 1, wherein the tubing access seat is movable in unison with the shunt valve member while the shunt valve member moves between the open and closed positions.

3. The apparatus according to claim 1, wherein the open positions of the shunt valve member and the tubing access valve member arc elevated above the closed positions.

4. The apparatus according to claim 1, further comprising a spring engaging the valve member for urging the tubing access valve member to the closed position.

5. The apparatus according to claim 1, further comprising a passage extending laterally through the shunt valve member, relative to a longitudinal axis of the valve housing, that communicates the interior of the valve housing with the shunt port while the shunt valve member is in the open position.

6. The apparatus according to claim 1, wherein the tubing access valve member comprises:
    a head that sealing engages the tubing access seat;
    a shank attached to the head; and wherein tubing access seat is mounted to the shunt valve member and the apparatus further comprises:
    a central support attached to the shunt valve member, having a bore that receives the shank and allows movement of the shank relative to the central support as the tubing access valve member moves between the open and closed positions; and
    a spring biased between the tubing access valve member and the central support for urging the head into sealing engagement with the tubing access seat.

7. The well according to claim 1, wherein the submersible pumping assembly comprises:
    a centrifugal pump driven by a downhole electrical motor.

8. In a well having a submersible pump assembly suspended on a string of tubing in a well, the improvement comprising:
    a valve housing installed with the tubing string above the submersible pump assembly, the valve housing having an interior in communication with fluid in the string of tubing above valve housing, and a shunt port communicating the interior of the valve housing with an annulus surrounding the string of tubing;

a shunt valve member slidably received within the valve housing for movement between upper and lower positions, the shunt valve member blocking communication through the shunt port from the interior of the valve housing to the annulus while in the upper position, and while in the lower position, allowing communication of the interior of the housing with the annulus through the shunt port;

a tubing access seat in the valve housing that when open allows flow of fluid from the submersible pump assembly through the valve housing and up the string of tubing;

a tubing access valve member that moves between a lower position, sealingly engaging the tubing access seat, and an upper position, allowing flow from the submersible pump assembly through the tubing access seat; and wherein pressure exerted by operation of the submersible pump assembly causes the shunt valve member and the tubing access valve member to move to the upper positions, and ceasing operation of the submersible pump assembly causes the shunt valve member and the tubing access valve member to move to the lower positions, allowing fluid in the tubing string to flow out the shunt port to equalize with fluid in the annulus.

9. The well according to claim 8, wherein the shunt valve member has an annular wall that sealingly engages the wall of the valve housing and a shunt passage extending through the annular wall that communicates the interior of the valve housing with the shut port while the shunt valve member is in the upper position.

10. The well according to claim 8, further comprising a spring biased against the tubing access valve member for urging the tubing access valve member downwardly into engagement with the tubing access seat.

11. The well according to claim 8, wherein the tubing access valve member comprises:

a generally conical head that engages the tubing access seat;

a shank extending upward from the head; and wherein the shunt valve member comprises:

a central support located above the tubing access scat and having a bore for receiving the shank; and a spring biased between the central support and the tubing access valve member for urging the tubing access valve member downward into sealing engagement with the tubing access seat.

12. The well according to claim 8 wherein the central support contains a plurality of flow passages positioned around the bore for the passage of fluid from the submersible pump assembly through the tubing access seat into the interior of the valve housing.

13. The well according to claim 8, wherein the submersible pumping assembly comprises:

a centrifugal pump driven by a downhole electrical motor.

14. A method of equalizing fluid in a tubing string in a well with a tubing annulus when a submersible pump assembly supported by the tubing string ceases operation, comprising:

(a) connecting a valve assembly into the tubing string at a point above the submersible pump assembly, the valve assembly including a valve housing having a shunt port leading to the tubing annulus, a shunt valve member slidably and sealingly received within the valve housing for movement between open and closed positions with the shunt port, a tubing access seat that communicates the submersible pump assembly with the string of tubing, and a tubing access valve member that moves between open and closed positions with the tubing access seat;

(b) operating the submersible pump assembly, resulting in pump fluid pressure that moves the shunt valve member to closed position and the tubing access valve member to the open position; then (c) ceasing operation of the submersible pump assembly, resulting in a loss of pump fluid pressure that causes the shunt valve member to move to the open position and the tubing access valve member to move to the closed position, allowing fluid in the tubing string to flow out the shunt port to equalize with fluid in the annulus.

15. The method according to claim 14, wherein step (a) further comprises biasing the tubing access valve member to the closed position.

16. The method according to claim 14, wherein step (b) results in the shunt valve member and the tubing access seat moving upward in unison until the shunt valve member contacts a stop shoulder provided in the valve housing.

17. The method according to claim 14, wherein the tubing access valve member is forced upward relative to the tubing access seat by the pump pressure after the shunt valve member has contacted the stop shoulder.

18. An apparatus for use with a submersible pump, comprising:

a valve housing adapted to be connected in a string of tubing above a submersible pump, the valve housing having a shunt port leading to a tubing annulus surrounding the string of tubing; and a valve mechanism carried in the valve housing for movement in response to pressure from the pump to an operational position blocking flow through the shunt port then allowing upward flow from the pump through the valve housing, and in response to a lack of pressure from the pump, to a shutdown position allowing outward flow through the shunt port and blocking downward flow into the pump.

19. The apparatus according to claim 18 wherein the valve mechanism moves axially in response to pressure from the pump.

* * * * *

UNITED STATES PATENT AND TRADEMARK OFFICE
CERTIFICATE OF CORRECTION

PATENT NO. : 6,289,990 B1  
DATED : September 18, 2001  
INVENTOR(S) : David B. Dillon et al.

Page 1 of 1

It is certified that error appears in the above-identified patent and that said Letters Patent is hereby corrected as shown below:

<u>Column 4,</u>  
Line 48, delete "sealing" and insert -- sealingly --  
Line 49, after "wherein" insert -- the --

Signed and Sealed this

Twenty-sixth Day of March, 2002

*Attest:*

*Attesting Officer*

JAMES E. ROGAN  
*Director of the United States Patent and Trademark Office*